UNITED STATES PATENT OFFICE.

HEINRICH JORDAN AND WILHELM NEELMEIER, OF LEVERKUSEN, NEAR COLOGNE, GERMANY, ASSIGNORS TO SYNTHETIC PATENTS CO., INC., OF NEW YORK, N. Y., A CORPORATION OF NEW YORK.

AZO DYES.

1,127,261. Specification of Letters Patent. Patented Feb. 2, 1915.

No Drawing. Application filed August 28, 1913. Serial No. 787,138.

*To all whom it may concern:*

Be it known that we, HEINRICH JORDAN and WILHELM NEELMEIER, doctors of philosophy, chemists, citizens of the German Empire, residing at Leverkusen, near Cologne-on-the-Rhine, Germany, have invented new and useful Improvements in New Azo Dyes, of which the following is a specification.

We have found that new and valuable azo dyestuffs can be obtained by combining the diazo compounds prepared from di- and tri-azole derivatives of oxyarylcarboxylic acid compounds having most probably the following general formula:

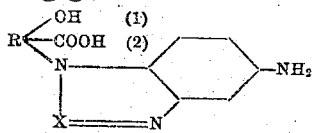

R stands for an aryl radical, e. g. $C_6H_3$—, $C_6H_2Cl$—, $C_6H_2SO_3H$—, $C_6H_2CH_3$—, X standing for —N=, or a carbon linked together with —H, —$CH_3$, —$C_6H_5$— or the like, such as aminomethylbenzimidazole-para-salicylic acid

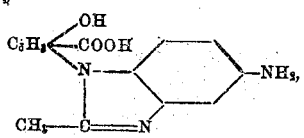

aminobenzimidazole - ortho - salicylic acid, aminobenzimidazole-para-sulfo- or chlorosalicylic acid, para-aminophenyl-4-azimino-salicylic acid

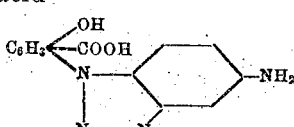

and the respective derivatives of cresotinic acid, etc., with azo dyestuff components e. g. naphthol sulfonic acids, aminonaphthol sulfonic acids, acetylaminonaphthol sulfonic acid, pyrazolone compounds, dioxyquinolin, etc. The new dyes are after being dried and pulverized in the shape of their alkaline salts dark powders soluble in water generally with a yellow to red to bluish-red coloration and in concentrated sulfuric acid with a red to bluish-red coloration and yielding upon reduction with acetic acid and zinc powder a compound of the above given general formula:

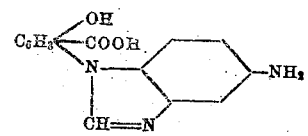

and an amin.

From yellow to red to violet chrome lakes fast to chlorin and soap can be produced on the fiber with the new coloring matters.

In order to illustrate the new process more fully the following example is given, the parts being by weight:

269 parts of aminobenzimidazole-ortho-aminosalicylic acid:

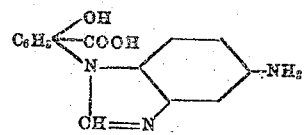

are diazotized with 69 parts of sodium nitrite in 200 parts of water at 20–25° C. and 270 parts of hydrochloric acid 19° Bé. The diazo compound thus obtained is then stirred into a cold solution of 405 parts of the disodium salt of acetyl-1.8-amino-naphthol-4.6-disulfonic acid containing 250 parts of soda. After stirring the combination is soon complete and the dyestuff is salted out and filtered off. It is after being dried and pulverized in the shape of its sodium salt a brown-red powder soluble in water with a blue red coloration and in concentrated sulfuric acid with a red-blue coloration; and yielding upon reduction with zinc powder and acetic acid amino-benzimidazole-ortho-aminosalicylic acid and 1-acetylamino-7-amino-8-naphthol-4.6-disulfonic acid. It has in a free state most probably the formula:

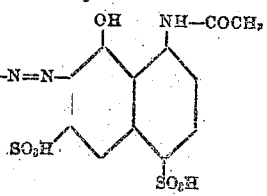

When printed with acetate of chromium on the fiber a pure blue-red shade is obtained fast to chlorin and to soap. It dyes also chrome wool.

Other azo dyestuff components may be used, e. g. 1-acetylamino-8-naphthol-3.6-disulfonic acid, naphthol-sulfonic acids, 1-monoethyloxy-8-naphthol-3.6-disulfonic acid.

In referring to the products of the present invention as azoles or polyazoles, etc., these terms are intended to include both the imidazoles (diazoles) in which the X of the above formula stands for —N=, and the azimino derivatives (triazoles) in which the X stands for a substituted carbon atom.

We claim:—

1. The new azo dyestuffs, having as one component thereof an azole derivative of an oxycarboxylic acid, which are after being dried and pulverized in the shape of their alkaline salts dark powders soluble in water generally with a yellow to red to bluish-red coloration and in concentrated sulfuric acid with a red to blue-red coloration; yielding upon reduction with acetic acid and zinc powder an oxyaryl-carboxylic acid compound containing a heterocyclic nucleus and an amin; and furnishing on the fiber from yellow to red to violet chrome lakes fast to chlorin and to soap, substantially as described.

2. The new azo dyestuffs, having as one component thereof an imidazole derivative of an oxycarboxylic acid, which are after being dried and pulverized in the shape of their alkaline salts dark powders soluble in water generally with a yellow to red to bluish-red coloration and in concentrated sulfuric acid with a red to blue-red coloration; yielding upon reduction with acetic acid and zinc powder an oxyarylcarboxylic acid compound containing a heterocyclic nucleus and an amin; and furnishing on the fiber from yellow to red to violet chrome lakes fast to chlorin and to soap, substantially as described.

3. The new azo dyestuffs having as components an azole derivative of an oxycarboxylic acid and a naphthalene sulfonic acid, which are after being dried and pulverized in the shape of their alkaline salts dark powders soluble in water generally with a yellow to red to bluish-red coloration and in concentrated sulfuric acid with a red to blue-red coloration, yielding upon reduction with acetic acid and zinc powder an oxyarylcarboxylic acid compound containing a heterocyclic nucleus and an amin; and furnishing on the fiber from yellow to red to violet chrome lakes fast to chlorin and to soap, substantially as described.

4. The new azo dyestuffs having as components an imidazole derivative of an oxycarboxylic acid and a naphthalene sulfonic acid, which are after being dried and pulverized in the shape of their alkaline salts dark powders soluble in water generally with a yellow to red to bluish-red coloration and in concentrated sulfuric acid with a red to blue-red coloration; yielding upon reduction with acetic acid and zinc powder an oxyarylcarboxylic acid compound containing a heterocyclic nucleus and an amin; and furnishing on the fiber from yellow to red to violet chrome lakes fast to chlorin and to soap, substantially as described.

5. The new azo dyestuffs having as components an azole derivative of an oxycarboxylic acid and a naphthol sulfonic acid, which are after being dried and pulverized in the shape of their alkaline salts dark powders soluble in water generally with yellow to red to bluish-red coloration and in concentrated sulfuric acid with a red to blue-red coloration; yielding upon reduction with acetic acid and zinc powder an oxyarylcarboxylic acid compound containing a heterocyclic nucleus and an amin; and furnishing on the fiber from yellow to red to violet chrome lakes fast to chlorin and to soap, substantially as described.

6. The new azo dyestuffs having as components an imidazole derivative of an oxycarboxylic acid and a naphthol sulfonic acid, which are after being dried and pulverized in the shape of their alkaline salts dark powders soluble in water generally with a yellow to red to bluish-red coloration and in concentrated sulfuric acid with a red to blue-red coloration; yielding upon reduction with acetic acid and zinc powder an oxyarylcarboxylic acid compound containing a heterocyclic nucleus and an amin; and furnishing on the fiber from yellow to red to violet chrome lakes fast to chlorin and to soap, substantially as described.

7. The new azo dyestuffs having in a free state most probably the formula:

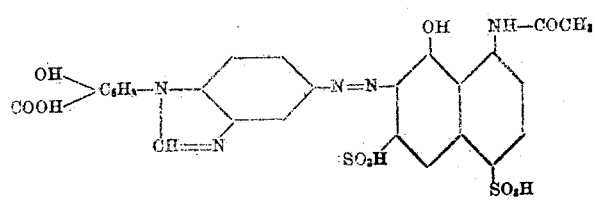

which is after being dried and pulverized in the shape of its sodium salt a brown red powder soluble in water with a red-blue coloration and in concentrated sulfuric acid with a red-blue coloration; yielding upon reduction with zinc powder and acetic acid aminobenzimidazole - orthoaminosalicylic acid and 1-acetylamino-7-amino-8-oxynaphthalene-4.6-disulfonic acid; furnishing when printed on the fiber with acetate of chromium a blue-red shades fast to chlorin and to soap, substantially as described.

In testimony whereof we have hereunto set our hands in the presence of two subscribing witnesses.

HEINRICH JORDAN.
WILHELM NEELMEIER.

Witnesses:
JULIUS FESTNER,
ALBERT NUFER.